(12) United States Patent
Hosokawa

(10) Patent No.: US 7,541,917 B2
(45) Date of Patent: Jun. 2, 2009

(54) OBSTACLE DISCRIMINATION DEVICE AND OBSTACLE DISCRIMINATION METHOD

(75) Inventor: Toshio Hosokawa, Anjo (JP)

(73) Assignee: DENSO CORPORATION, Kariya (JP)

( * ) Notice: Subject to any disclaimer, the term of this patent is extended or adjusted under 35 U.S.C. 154(b) by 473 days.

(21) Appl. No.: 11/270,449

(22) Filed: Nov. 10, 2005

(65) Prior Publication Data

US 2006/0103514 A1   May 18, 2006

(30) Foreign Application Priority Data

Nov. 16, 2004   (JP)   ............... 2004-332257

(51) Int. Cl.
  *B60Q 1/00*   (2006.01)
  *B60R 22/00*   (2006.01)
  *E05F 15/00*   (2006.01)
  *G05D 3/00*   (2006.01)
  *B60K 28/10*   (2006.01)
  *B60T 7/12*   (2006.01)
  *B60T 7/22*   (2006.01)

(52) U.S. Cl. .................... 340/436; 180/274; 701/45

(58) Field of Classification Search ............. 340/436, 340/438; 180/175, 271, 274, 282; 701/45, 701/301, 302

See application file for complete search history.

(56) References Cited

U.S. PATENT DOCUMENTS

| 6,784,792 B2 | 8/2004 | Mattes et al. |
| 2004/0186643 A1* | 9/2004 | Tanaka et al. ................. 701/45 |
| 2004/0210367 A1* | 10/2004 | Takafuji et al. ............... 701/45 |
| 2006/0091653 A1* | 5/2006 | De Mersseman et al. .... 280/735 |

FOREIGN PATENT DOCUMENTS

WO   WO 03/082639 A1   10/2003

* cited by examiner

*Primary Examiner*—Toan N Pham
*Assistant Examiner*—Jennifer Mehmood
(74) *Attorney, Agent, or Firm*—Posz Law Group, PLC (57) ABSTRACT

An obstacle discrimination device has a first detection unit, a second detection unit which is more resistant to damage than the first detection unit, and an obstacle discrimination ECU. The obstacle discrimination ECU performs at least one of a discrimination for determining whether or not an obstacle colliding with a vehicle is a lightweight obstacle and a discrimination for determining whether or not the obstacle is a heavyweight obstacle based on detection signals of the first detection unit, and performs a discrimination for determining whether or not the obstacle is the heavyweight obstacle based on detection signals of the second detection unit. The obstacle discrimination ECU sends instructions corresponding to discrimination results to a pedestrian protection device and the like of the vehicle.

23 Claims, 5 Drawing Sheets

| DISCRIMINATION MAP OF OBSTACLE DISCRIMINATION ECU | | PEDESTRIAN PROTECTION AIRBAG | PASSENGER PROTECTION AIRBAG |
|---|---|---|---|
| FOR ACCELERATION SENSOR | Gt h1 —⁠ HEAVYWEIGHT OBSTACLE Gt h2 —⁠ | NOT DEPLOY | DEPLOY NOT DEPLOY |
| FOR OPTICAL FIBER SENSOR | Mt h —⁠ PEDESTRIAN LIGHTWEIGHT OBSTACLE | DEPLOY NOT DEPLOY | |

| DISCRIMINATION MAP OF OBSTACLE DISCRIMINATION ECU | | PEDESTRIAN PROTECTION AIRBAG | PASSENGER PROTECTION AIRBAG |
|---|---|---|---|
| FOR ACCELERATION SENSOR | Gt h1 — HEAVYWEIGHT OBSTACLE — Gt h2 | NOT DEPLOY | DEPLOY — NOT DEPLOY |
| FOR OPTICAL FIBER SENSOR | PEDESTRIAN — Mt h — LIGHTWEIGHT OBSTACLE | DEPLOY — NOT DEPLOY | |

OBSTACLE DISCRIMINATION DEVICE AND OBSTACLE DISCRIMINATION METHOD

CROSS REFERENCE TO RELATED APPLICATION

This application is based on a Japanese Patent Application No. 2004-332257 filed on Nov. 16, 2004, the disclosure of which is incorporated herein by reference.

FIELD OF THE INVENTION

The present invention relates to an obstacle discrimination device and an obstacle discrimination method for sort-distinguishing an obstacle colliding with a vehicle, for example.

BACKGROUND OF THE INVENTION

An obstacle discrimination device which has a first detection unit (e.g., pressure sensor or strain gauge), a second detection unit (e.g., pressure sensor or strain gauge) and an obstacle discrimination ECU (electronic control unit) is provided, for example, referring to JP-2003-535769A. The first detection unit is mounted at a front bumper of a vehicle, and the second detection unit is attached to a bonnet of the vehicle. When a pedestrian at a vehicle front side collides with the vehicle, the pedestrian firstly contacts the front bumper and then rotates around the contact portion (as rotation axis) with the front bumper, thereafter falling onto the bonnet.

In this case, the first detection unit detects the pressure (or strain) applied to the front bumper due to contact with the pedestrian, and sends detection signals to the obstacle discrimination ECU. The second detection unit detects the pressure (or strain) exerted at the bonnet due to contact with the pedestrian, and sends detection signals to the obstacle discrimination ECU.

The obstacle discrimination ECU determines whether or not an obstacle is a pedestrian, according to whether or not two judgment criterions are satisfied. At a first judgment step, the detection signals from the first and second detection units are compared with a first predetermined value to determine whether or not the first judgment criterion is satisfied. At a second judgment step, at least one of a vehicle velocity variation and a vehicle acceleration variation is detected and compared with a second predetermined value, to determine whether or not the second judgment criterion is satisfied. When it is determined that the obstacle is the pedestrian, the obstacle discrimination ECU activates (deploys) a pedestrian protection device of the vehicle.

However, in this case, the obstacle discrimination device distinguishes the collision with all kinds of obstacles by performing a AND-process of the detection signals of the first and second detection units. That is, both the first and second detection units are necessary for obstacle discriminations in a heavy collision and a light collision. The light collision is a collision where the lightweight obstacle colliding with the vehicle is to be discriminated from a heavyish obstacle (including pedestrian and heavyweight obstacle which are heavier than lightweight obstacle). The heavy collision is a collision where the heavyweight obstacle colliding with the vehicle is to be discriminated from a lightish obstacle (including pedestrian and lightweight obstacle which are lighter than heavyweight obstacle).

Therefore, when one of the first and second detection units is damaged, it becomes difficult to distinguish the obstacle. Especially, the first detection unit is mounted at the front pump, which will be firstly deformed in the collision to buffer the impact. That is, the first detection unit is readily broken in the collision, particularly in the heavy collision. If the first detection unit is damaged, it becomes difficult to discriminate the heavyweight obstacle from the lightish obstacle even when the second detection unit remains sound.

SUMMARY OF THE INVENTION

In view of the above-described disadvantages, it is an object of the present invention to provide an obstacle discrimination device and an obstacle discrimination method for readily discriminating a heavyweight obstacle from a lightish obstacle in a heavy collision.

According to an aspect of the present invention, an obstacle discrimination device is provided to discriminate among a pedestrian, a lightweight obstacle lighter than the pedestrian and a heavyweight obstacle heavier than the pedestrian in a collision of a vehicle. The obstacle discrimination device has a first detection unit, a second detection unit which is more resistant to an impact of the collision than the first detection unit, and an obstacle discrimination ECU. The obstacle discrimination ECU performs at least one of a discrimination for determining whether or not an obstacle colliding with the vehicle is the lightweight obstacle and a discrimination for determining whether or not the obstacle is the heavyweight obstacle based on detection signals of the first detection unit, and performs a discrimination for determining whether or not the obstacle is the heavyweight obstacle based on detection signals of the second detection unit. The obstacle discrimination ECU sends instructions corresponding to discrimination results to a pedestrian protection device of the vehicle.

In this case, the second detection unit can be arranged at a part of the vehicle where a less collision load is applied or be provided with a sturdy casing, thus being more resistant to the impact. Therefore, the discrimination of the heavyweight obstacle can be substantially performed based on the detection signals of the second detection unit, even when the first detection unit is broken.

Preferably, the obstacle discrimination ECU performs the discrimination for determining whether or not the obstacle is the lightweight obstacle and the discrimination for determining whether or not the obstacle is the heavyweight obstacle, based on the detection signals of the first detection unit. The obstacle discrimination ECU performs the backup discrimination for determining whether or not the obstacle is the heavyweight obstacle based on the detection signals from the second detection unit.

That is, the obstacle discrimination ECU discriminates among the pedestrian, the lightweight obstacle and the heavyweight obstacle based on the detection signals of the first detection unit. Furthermore, the backup discrimination is performed based on the detection signals of the second detection unit. In the backup discrimination, the heavyweight obstacle is discriminated from a lightish obstacle (including pedestrian and lightweight obstacle which are lighter than heavyweight obstacle).

Accordingly, the discrimination of the heavyweight obstacle can be readily performed based on the detection signals of the second detection unit even when the first detection unit is broken. Therefore, a misoperation of the pedestrian protection device due to a discrimination fault of the heavyweight obstacle from the lightish obstacle can be restricted.

More preferably, the obstacle discrimination ECU performs the discrimination for determining whether or not the obstacle is the lightweight obstacle based on the detection signals of the first detection unit, and the discrimination for determining whether or not the obstacle is the heavyweight obstacle based on the detection signals of the second detection unit.

Thus, the obstacle discrimination ECU discriminates among the pedestrian, the lightweight obstacle and the heavyweight obstacle based on the detection signals of both the first and second detection units. Therefore, as compared with the case where the collision with all kinds of obstacles are discriminated according to detection, signals of a single sensor, the dynamic ranges of sensors constructing the first and second detection units can be decreased so that the detection accuracy of the sensors can be improved. Accordingly, the obstacle discrimination accuracy is bettered.

Because the first detection unit is not used to distinguish the heavyweight obstacle, the obstacle discrimination accuracy in the heavy collision will not be worsened even when the first detection unit is broken due to the collision with the heavyweight obstacle.

More preferably, the first detection unit is mounted at a low-stiffness member of the vehicle. The low-stiffness member is readily deformed to buffer an impact in the collision. The second detection unit is mounted at a high-stiffness member of the vehicle. The high-stiffness member is more resistant to the impact than the low-stiffness member.

The low-stiffness member provided for the vehicle will be deformed (or crashed) to absorb the impact in the collision including that with the lightweight obstacle (i.e., light collision). In this case, a deformation of the high-stiffness member is restricted even in the heavy collision so that the second detection unit is more resistant to the damage, as compared with the case where the second detection unit is attached to the low-stiffness member.

Because the first detection unit is arranged at the low-stiffness member which is readily deformed in the collision, the collision can be speedily detected even when the lightweight obstacle collides with the vehicle.

In this case, the component of the vehicle is discriminated between the low-stiffness member and the high-stiffness member according to whether or not the component is used to buffer the impact in the light collision, regardless of the material and name of the component.

More preferably, the first detection unit is an optical fiber sensor (being load sensor) which has a light emitting unit D1 for emitting light, an optical fiber member for transmitting light emitted by the light emitting unit D1, and a light receiving unit D2 for receiving light through the optical fiber member. The optical fiber sensor detects the collision load according to a light receiving amount of the light receiving unit D2, which varies responding to a deformation of the optical fiber member in the collision.

In this case, the arrangement length and path of the optical fiber member can be set according to a preferable collision-detecting range. For example, the optical fiber member can be arranged to traverse the vehicle-widthwise whole of a front bumper (low-stiffness member). Thus, the collision detection range can be enlarged.

According to another aspect of the present invention, an obstacle discrimination method for discriminating among a pedestrian, a lightweight obstacle and a heavyweight obstacle includes a light-collision discrimination step and a heavy-collision discrimination step. At the light-collision discrimination step, it is determined whether or not an obstacle colliding with a vehicle is the lightweight obstacle based on detection signals of a first detection unit. At the heavy-collision discrimination step, it is determined whether or not the obstacle is the heavyweight obstacle based on the detection signals of the first detection unit and detection signals of a second detection unit.

Because the detection signals of the first detection unit are not used for discrimination of the heavyweight obstacle, the obstacle discrimination accuracy in the heavy collision will not be worsened even when the first detection unit is damaged.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENT

First Embodiment

Figure 1:
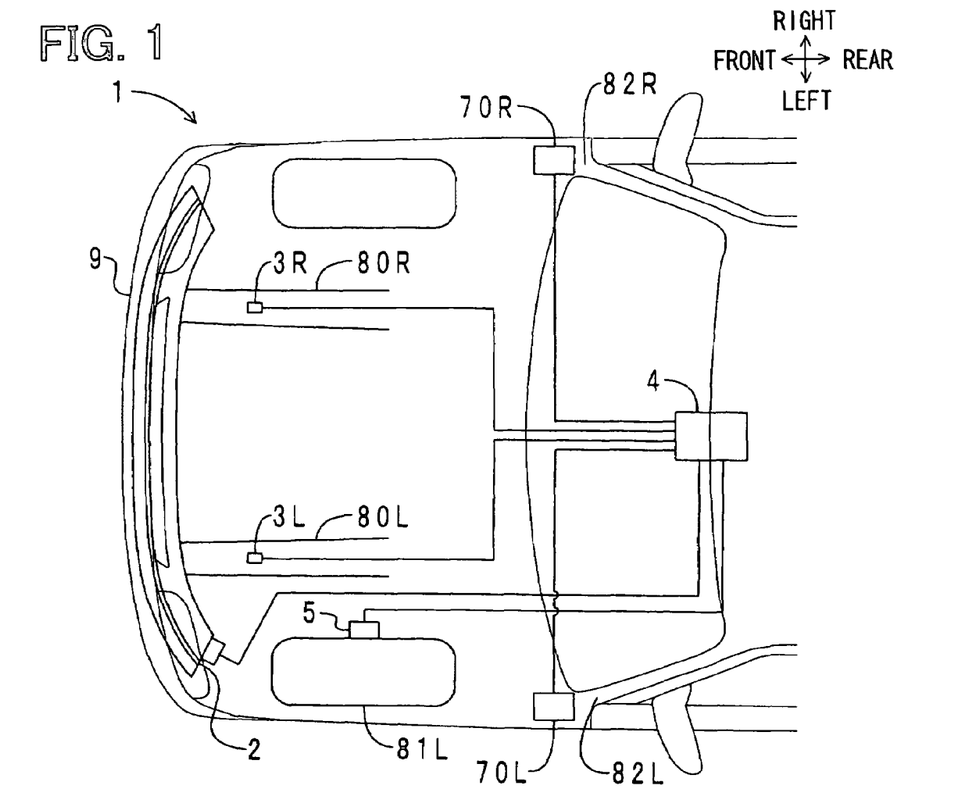
FIG. 1 is a transparent plan view showing a vehicle at which an obstacle discrimination device is mounted according to a first embodiment of the present invention.
Figure 2:
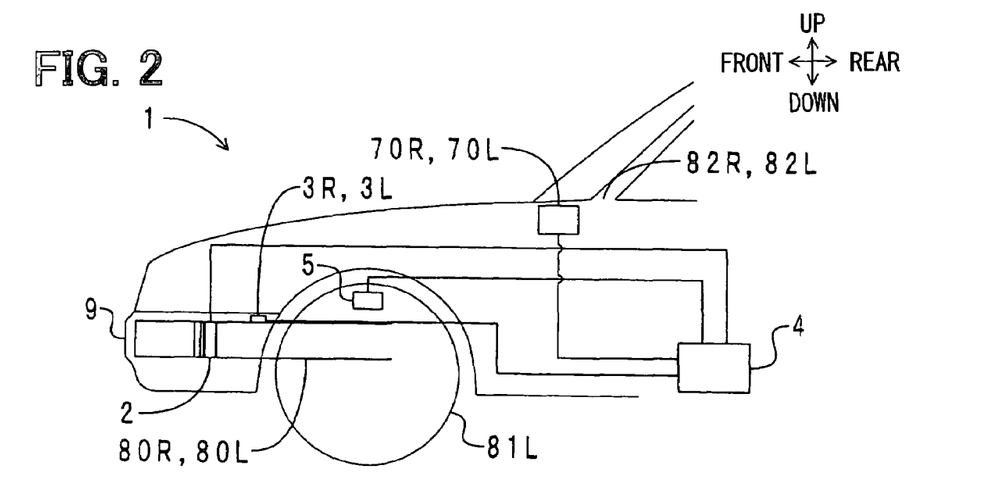
FIG. 2 is a transparent side view showing the vehicle in FIG. 1.
Figure 3:
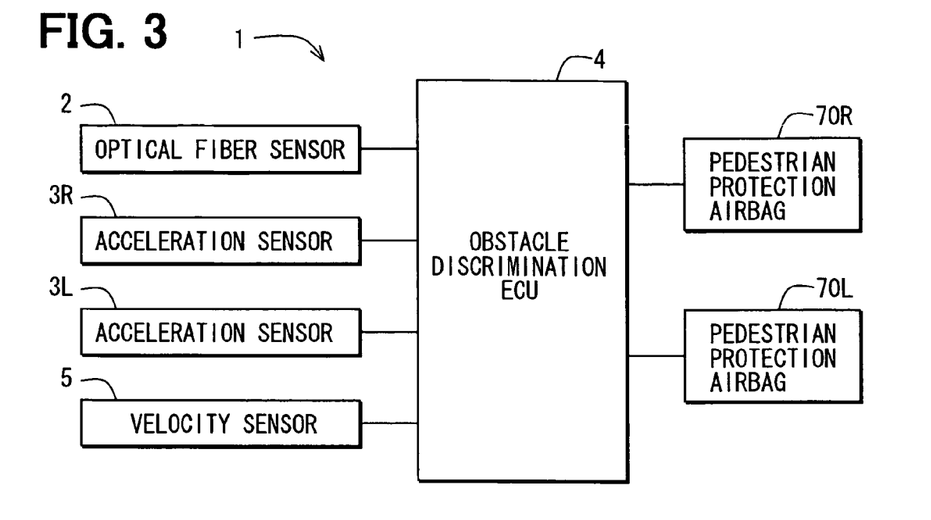
FIG. 3 is a block diagram showing a construction of the obstacle discrimination device according to the first embodiment.

An obstacle discrimination device 1 according to a first embodiment of the present invention will be described with reference to FIGS. 1-7. The obstacle discrimination device 1 is suitably used for a vehicle to sort-distinguish an obstacle colliding with the vehicle. As shown in FIGS. 1 and 2, the obstacle discrimination device 1 is provided with a first detection unit (e.g., load sensor such as optical fiber sensor 2), a second detection unit (e.g., acceleration sensors 3R and 3L), an obstacle discrimination ECU 4 and a vehicle velocity sensor 5.

The obstacle discrimination ECU 4 is arranged at a lower side of an instrument panel (not shown) and an upper side of a floor tunnel (not shown) of the vehicle. The obstacle discrimination ECU 4 also functions as an airbag ECU for activating a passenger protection airbag (not shown). The obstacle discrimination ECU 4 has an A/D (analog/digital) converter, a discrimination circuit and an activation circuit, which are not shown.

The acceleration sensors 3R and 3L are respectively mounted at upper surfaces of front side members 80R and 80L (high-stiffness member), which are respectively disposed at a vehicle right side and a vehicle light side. The vehicle light side and the vehicle right side are defined according to a traveling direction of the vehicle. The acceleration sensors 3R and 3L also function as satellite sensors for activating the passenger protection airbag.

The optical fiber sensor 2 is attached to a front bumper 9 (low-stiffness member) of the vehicle. The vehicle velocity sensor 5 is attached to a steering arm (not shown) of a wheel 81L to detect a velocity of the vehicle. The steering arm faces a rotation portion of the wheel 81L. The optical fiber sensor 2, the acceleration sensor 3R, 3L and the vehicle velocity sensor 5 are connected (communicated) with the obstacle discrimination ECU 4 through wire harnesses, for example.

Pedestrian protection airbags 70R and 70L are respectively attached to root portions of A-pillars 82R and 82L, and communicated with the obstacle discrimination ECU 4 through wire harnesses or the like. The pedestrian protection airbags 70R and 70L are included in a pedestrian protection device of the vehicle.

Next, the arrangement and construction of the optical fiber sensor 2 of the obstacle discrimination device 1 will be described.

Figure 4:
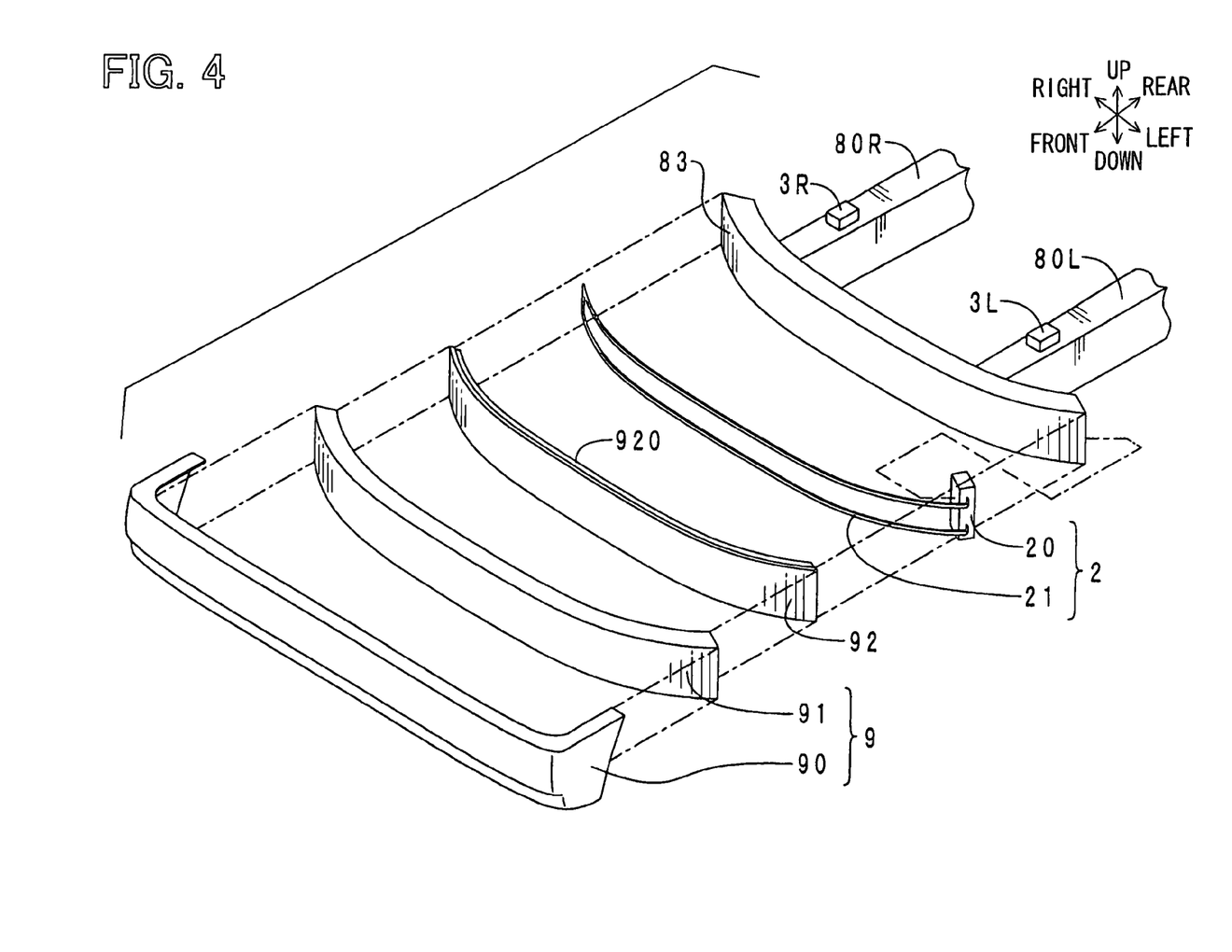
FIG. 4 is a disassembled perspective view showing a front bumper at which an optical fiber sensor of the obstacle discrimination device is mounted according to the first embodiment.

FIG. 4 is a disassembled perspective view showing the front bumper 9, to which the optical fiber sensor 2 is attached. The front bumper 9 includes a bumper cover 90 and a bumper absorber 91, which extend in a vehicle light-right direction (i.e., vehicle width direction). The bumper cover 90, being made of a resin or the like, has a plate shape. Right end and left end of the bumper cover 90 are bent to a vehicle rear side. The bumper cover 90 constructs a part of an outer surface of the vehicle.

The bumper absorber 91, being made of a foamed resin or the like, has a plate shape. The bumper absorber 91 is arranged at the vehicle rear side of the bumper cover 90. A load transmission plate 92 (made of resin, for example) is positioned at the vehicle rear side of the bumper absorber 91, and extends in the vehicle width direction. A fiber guide member 920 is attached to a rear surface of the load transmission plate 92. A plate-shaped bumper reinforce member 83, being made of a metal or the like, extends in the vehicle width direction and is attached to front ends of the front side members 80L and 80R.

The optical fiber sensor 2 is provided with a sensor ECU 20 and an optical fiber member 21. The optical fiber member 21, being made of a light-conductive resin or the like, is disposed at the rear side of the load transmission plate 92. The optical fiber member 21 having a cord shape can be installed to traverse the whole load transmission plate 92 (i.e., traverses the whole front bumper 9) in the vehicle width direction. For example, the optical fiber member 21 can be arranged to twice traverse the load transmission plate 92 in the vehicle width direction. In this case, the optical fiber member 21 is indirectly mounted at the rear surface of the bumper absorber 91, with the load transmission plate 92 being inserted therebetween.

Figure 5:
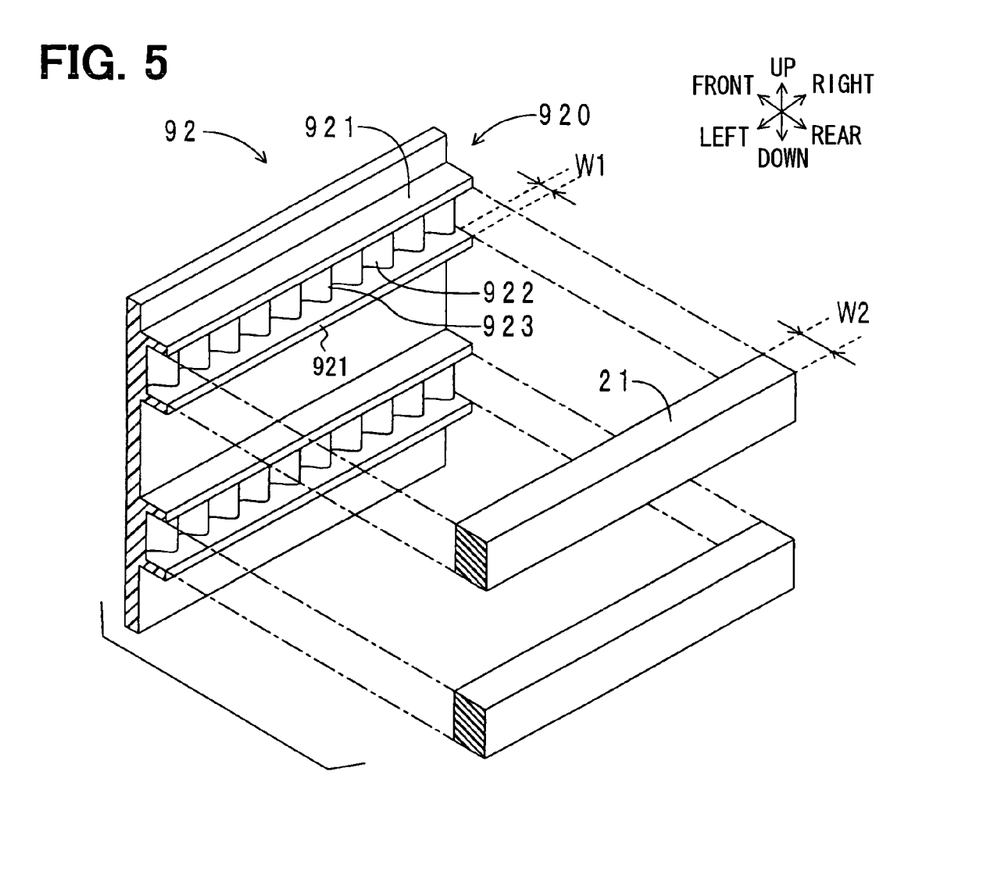
FIG. 5 is a disassembled perspective view showing an arrangement of an optical fiber member of the optical fiber sensor according to the first embodiment.

FIG. 5 is a disassembled perspective view showing a widthwise part of the optical fiber member 21 and the load transmission plate 92. Referring to FIG. 5, the fiber guide member 920 is attached to the rear surface of the load transmission plate 92, and extends along the arrangement path of the optical fiber member 21. The fiber guide member 920 having a U-shaped cross section is provided with a pair of side wall portions 921 and a concave-convex portion 922.

Each of the side wall portions 921 has a substantial rib shape. The side wall portions 921 protrude toward the vehicle rear side respectively from an upper end and a lower end of the concave-convex portion 922, to construct an opening facing the vehicle rear side. That is, the concave-convex portion 922 is arranged in the opening.

The concave-convex portion 922 is provided with, for example, a wave shape which has a wave-length direction in the arrangement direction (i.e., vehicle width direction) of the optical fiber member 21 and an amplitude direction in the vehicle front-rear direction (i.e., vehicle longitudinal direction). The concave-convex portion 922 is integrally attached to the rear surface of the load transmission plate 92.

The optical fiber member 21 is partially accommodated in the opening of the fiber guide member 920, as shown by the one-point chain line in FIG. 5. A front surface of the optical fiber member 21 contacts a top surface 923 of the concave-convex portion 922. Referring to FIG. 5, a distance W1 between the top surface 923 of the concave-convex portion 922 and a rear brim (i.e., rear end) of the side wall portion 921 is smaller than a thickness W2 (being dimension of vehicle longitudinal direction) of the optical fiber member 21. Thus, a rear portion (i.e., portion having thickness of W2-W1) of the optical fiber member 21 protrudes from the side wall portion 921 toward the vehicle rear side.

Referring to FIG. 4, the sensor ECU 20 is connected with two longitudinal-direction ends of the optical fiber member 21. The sensor ECU 20 is mounted at, for example, a left surface of the bumper reinforce member 83 and communicated with the obstacle discrimination ECU 4 through wire harness or the like.

Figure 6:
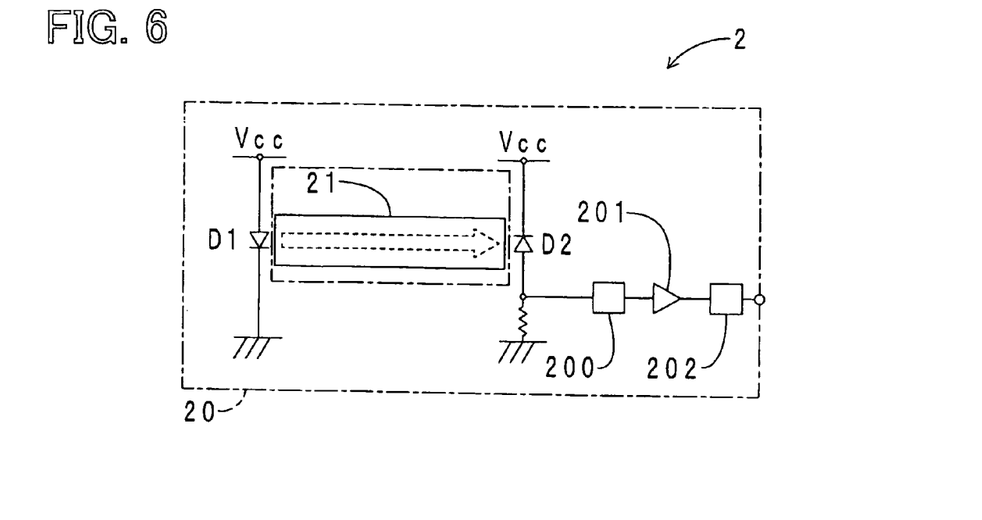
FIG. 6 is a circuit diagram of the optical fiber sensor according to the first embodiment.

The sensor ECU 20 is provided with a light emitting unit D1 (e.g., light emitting diode) and a light receiving unit D2 (e.g., photo diode). Referring to FIG. 6, the light emitting diode (LED) D1 is electrically connected in a circuit of the optical fiber sensor 2, in the manner that a power supply voltage Vcc of the circuit is applied to the light emitting diode D1 in a forward direction of the light emitting diode D1. The photo diode D2 is electrically connected in the circuit in the manner that the power supply voltage Vcc is applied to the photo diode D2 in a direction reverse to a forward direction of the photo diode D2.

The optical fiber member 21 is connected with the light emitting diode D1 and the photo diode D2. The photo diode D2 can receive light emitted by the light emitting diode D1 through the optical fiber member 21, and generate electric current responding to a light-receiving amount of the photo diode D2.

The circuit of the optical fiber sensor 2 is provided with a current-voltage converting unit 200, which detects grounding-side current of the photo diode D2 and converts detection current into detection voltage. The detection voltage is amplified by an amplifier 201 of the circuit, and then transmitted to the obstacle discrimination ECU 4 through a communication I/F (interface) 202.

Next, the operation of the obstacle discrimination device 1 in a collision will be described.

When the bumper cover 90 of the front bumper 9 of the vehicle collides with an obstacle, an impact due to the collision will be transmitted to the optical fiber member 21 through the bumper cover 90, the bumper absorber 91 and the load transmission plate 92, which has a relatively high stiffness. Thus, the optical fiber member 21 is deformed (compressed) between the fiber guide member 920 of the load transmission plate 92 and the bumper reinforce member 83.

When the optical fiber member 21 is deformed, the light amount received by the photo diode D2 from the light emitting diode D1 through the optical fiber member 21 will be changed. Therefore, the current flowing through the photo diode D2 varies. The current is detected by the current-voltage converting unit 200 from the grounding side of the photo diode D2, and converted into the detection voltage. The detection voltage is amplified by the amplifier 201, and transmitted to the obstacle discrimination ECU 4 through the communication I/F 202.

When the vehicle collides with the obstacle, the impact is also transmitted to the front side members 80R and 80L. Thus, the acceleration sensor 3R, 3L can detect an acceleration (or deceleration) of the vehicle due to the collision. Acceleration signals from the acceleration sensor 3R, 3L are transmitted to the obstacle discrimination ECU 4.

Figure 7:
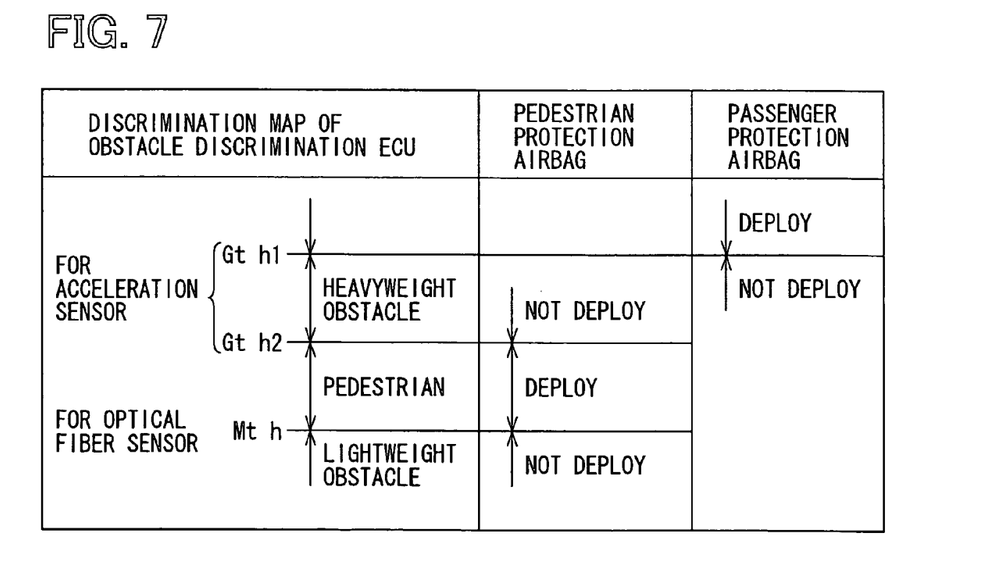
FIG. 7 is a schematic diagram showing a discrimination map of an obstacle discrimination ECU of the obstacle discrimination device according to the first embodiment.

FIG. 7 shows a discrimination map of the obstacle discrimination ECU 4 of the obstacle discrimination device 1. The discrimination map is beforehand memorized in a ROM (not shown) of the obstacle discrimination ECU 4. The discrimination circuit of the obstacle discrimination ECU 4 performs a discrimination process based on the discrimination map.

In this case, the detection voltage signals transmitted from the optical fiber sensor 2 are converted into digital data by the A/D converter. The digital data of the optical fiber sensor 2 will be compared with an optical-fiber-sensor threshold value Mth of the discrimination map.

Similarly, the acceleration signals transmitted from the acceleration sensors 3R and 3L are respectively converted into digital data by the A/D converter. The digital data of the acceleration sensors 3R and 3L will be compared with acceleration-sensor threshold values Gth1 and Gth2 of the discrimination map. In this case, the threshold value Gth1 is set for activation of the passenger protection airbag.

In the case where the digital data of the optical fiber sensor 2 are smaller than the threshold value Mth, the discrimination circuit determines that the obstacle is a lightweight obstacle (being lighter than pedestrian and heavyweight obstacle). That is, a light-collision discrimination step for discriminating the lightweight obstacle from a heavyish obstacle (including heavyweight obstacle and pedestrian) is performed.

In the case where the digital data of the optical fiber sensor 2 are larger than or equal to the threshold value Mth and the digital data of the acceleration sensor 3R, 3L are smaller than the threshold value Gth2, the discrimination circuit determines that the obstacle is the pedestrian.

In the case where the digital data of the acceleration sensor 3R, 3L are larger than or equal to the threshold value Gth2, the discrimination circuit determines that the obstacle is the heavyweight obstacle (being heavier than pedestrian and lightweight obstacle). That is, a heavy-collision discrimination step where the heavyweight obstacle is discriminated from a lightish obstacle (including lightweight obstacle and pedestrian) is performed.

In the case where the digital data of the acceleration sensor 3R, 3L are larger than or equal to the threshold value Gth1, the discrimination circuit determines that the passenger protection airbag is to be deployed.

According to the above-described judgment results, the activation circuit of the obstacle discrimination ECU 4 will send corresponding instructions (commands) to the passenger protection airbag, the pedestrian protection airbags 70R, 70L and the like.

Specifically, in the case where the digital data of the optical fiber sensor 2 are larger than or equal to the threshold value Mth and the digital data of the acceleration sensor 3R, 3R are smaller than the threshold value Gth2 (i.e., it is determined that obstacle is pedestrian), the discrimination circuit sends activation orders to the pedestrian protection airbags 70R and 70L. Thus, the pedestrian protection airbags 70R and 70L are speedily deployed to the outer side of the vehicle, to protect the pedestrian.

In the case where the digital data of the acceleration sensors 3R and 3L are larger than or equal to the threshold value Gth1, the discrimination circuit sends an activation order to the passenger protection airbag. Thus, the passenger protection airbag is speedily deployed to the inner side of a passenger compartment of the vehicle, to protect the passenger.

Vehicle velocity data (i.e., rev data) of the wheel 81L, which are sent from the velocity sensor 5 to the obstacle discrimination ECU 4, are used to correct the optical-fiber-sensor threshold value Mth, the acceleration-sensor threshold values Gth1 and Gth2 responding to the vehicle velocity.

Next, the effects of the obstacle discrimination device 1 will be described.

According to the first embodiment, the heavyweight obstacle can be discriminated from the lightweight obstacle and the pedestrian based on the detection signals from the acceleration sensor 3R, 3L. The lightweight obstacle can be discriminated from the heavyweight obstacle and the pedestrian based on the detection signal from the optical fiber sensor 2. Thus, the obstacle discrimination device 1 can distinguish the heavyweight obstacle, the pedestrian and the lightweight obstacle.

As compared with the case where the collision with all kinds of obstacles is detected by a single sensor, dynamic ranges of the optical fiber sensor 2, the acceleration sensors 3R and 3L of the obstacle discrimination device 1 can be decreased. Thus, the detection accuracy of the optical fiber sensor 2, the acceleration sensors 3R and 3L are increased, so that the obstacle discrimination accuracy of the obstacle discrimination device 1 can be improved.

According to the first embodiment, the heavy-collision discrimination step for distinguishing the heavyweight obstacle can be performed without using the detection signals from the optical fiber sensor 2. The acceleration sensors 3R and 3L are respectively mounted at the upper surfaces of the front side members 80R and 80L. The optical fiber sensor 2 is attached to the load transmission plate 92 which is disposed at the vehicle front side of the front side members 80R and 80L, to be more readily damaged than the acceleration sensors 3R and 3L due to the collision from the vehicle front side.

In the case where the vehicle collides with the heavyweight obstacle (i.e., optical fiber sensor 2 is relatively readily damaged), the discrimination between the heavyweight obstacle and the lightish obstacle can be performed based on the detection signals of the acceleration sensors 3R and 3L even when the optical fiber sensor 2 is broken in the heavy collision. Thus, when the heavyweight obstacle collides with the vehicle, a misoperation of the pedestrian protection airbag 70R, 70L can be restricted. Moreover, in the case where the vehicle collides with the heavyweight obstacle, the obstacle discrimination accuracy will not be worsened (i.e., heavyweight obstacle can be appropriately detected) even when the optical fiber sensor 2 is damaged.

Therefore, the breaking-resistant strength (grade) of the optical fiber sensor 2 can be set lower. For example, the breaking-resistant strength of the optical fiber sensor 2 can be decreased, to the extent that the optical fiber sensor 2 is still sturdy against a heaviest pedestrian (i.e., having largest effective mass). Thus, according to this embodiment, the manufacture cost of the optical fiber sensor 2 of the obstacle discrimination device 1 can be reduced.

Moreover, in the obstacle discrimination device 1, the acceleration sensors 3R and 3L are respectively mounted at the front side members 80R and 80L which have a relatively high stiffness, thus being resistant to the impact even when the vehicle collides with the heavyweight obstacle. Therefore, the obstacle discrimination can be substantially performed even in the heavy collision.

Moreover, according to this embodiment, the optical fiber sensor 2 is mounted at the front bumper 9, to which the impact due to the collision is directly applied. Thus, the impact can be substantially exerted at the front bumper 9 even when the vehicle collides with the lightweight obstacle (i.e., light collision), so that the collision is appropriately detected. Therefore, the obstacle discrimination accuracy of the obstacle discrimination device 1 can be improved.

Furthermore, because the optical fiber sensor 2 is mounted at the front bumper 9 to be capable of speedily detecting the collision, the pedestrian protection airbags 70R and 70L can be rapidly activated and deployed when it is determined that the obstacle is the pedestrian.

As described above, the accelerations sensors 3R and 3L are arranged at the vehicle rear side of the optical fiber sensor 2. The impact due to the collision is transmitted from the vehicle front side to the vehicle rear side and the impact energy is gradually consumed during the transmission to the accelerations sensors 3R and 3L, so that damage of the acceleration sensor 3R, 3L can be restricted.

In the obstacle discrimination device 1, the load sensor (optical fiber sensor 2) is used as the first detection unit. The detection signals of the load sensor are substantially resistant to influence of the vehicle traveling situation, for example, a bad road traveling. Therefore, the detection accuracy of the collision with the lightweight obstacle can be improved, thus bettering the obstacle discrimination accuracy.

Furthermore, the optical fiber member 21 is arranged to traverse the widthwise whole of the load transmission plate 92. Thus, the collision can be detected in the whole range in the vehicle width direction.

Moreover, what is transmitted by the optical fiber member 21 is light from the light emitting diode D1, so that it is unnecessary to provide an electromagnetic wave shield for the sensor ECU 20 and the like. Accordingly, the installment cost of the first detection unit (optical fiber sensor 2) can be reduced. Furthermore, in this case, other electric apparatuses adjacent to the optical fiber sensor 2 will not be affected by the electromagnetic wave.

Furthermore, the acceleration sensors 3R and 3L are mounted at the front side members 80R and 80L having a relatively high stiffness. Thus, the impact due to the collision can be substantially transmitted to the acceleration sensors 3R and 3L through the front side members 80R and 80L. Accordingly, the collision detection accuracy in the heavy collision can be improved.

According to the first embodiment, the acceleration sensors 3R and 3L are also used to provide detection signals for activating the passenger protection airbag and the pedestrian protection airbags 70R and 70L. Thus, the component number of the vehicle can be reduced, as compared with the case where the passenger protection device and the pedestrian protection device are respectively provided with exclusive acceleration sensors.

Second Embodiment

Figure 8:
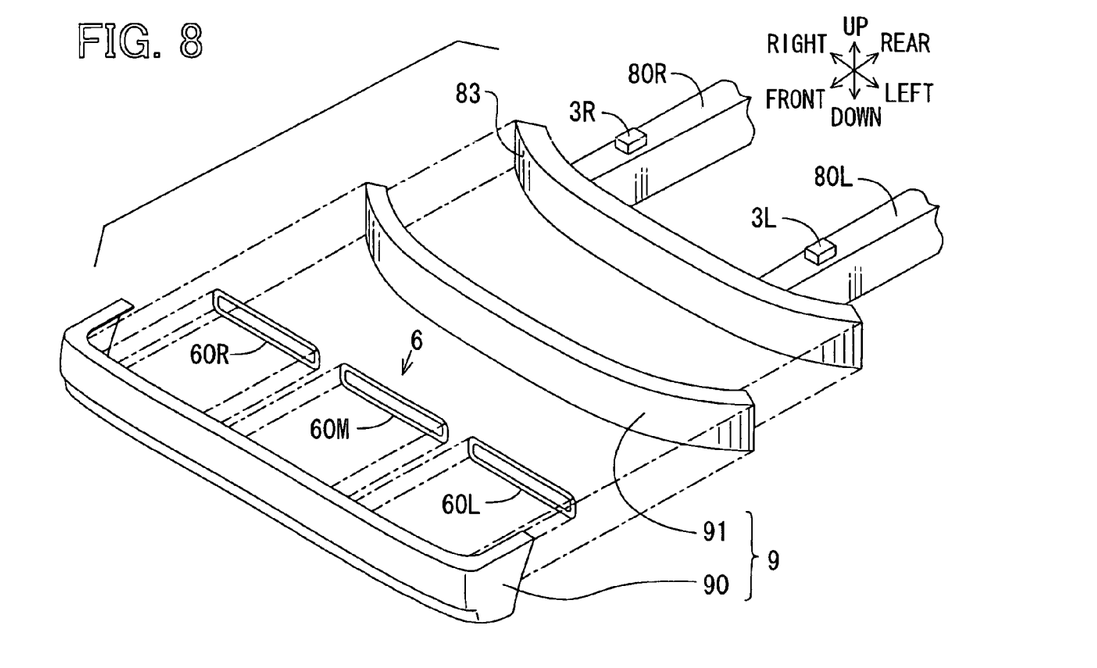
FIG. 8 is a disassembled perspective view showing a front bumper at which an impedance sensor of an obstacle discrimination device is mounted according to a second embodiment of the present invention.
Figure 9:
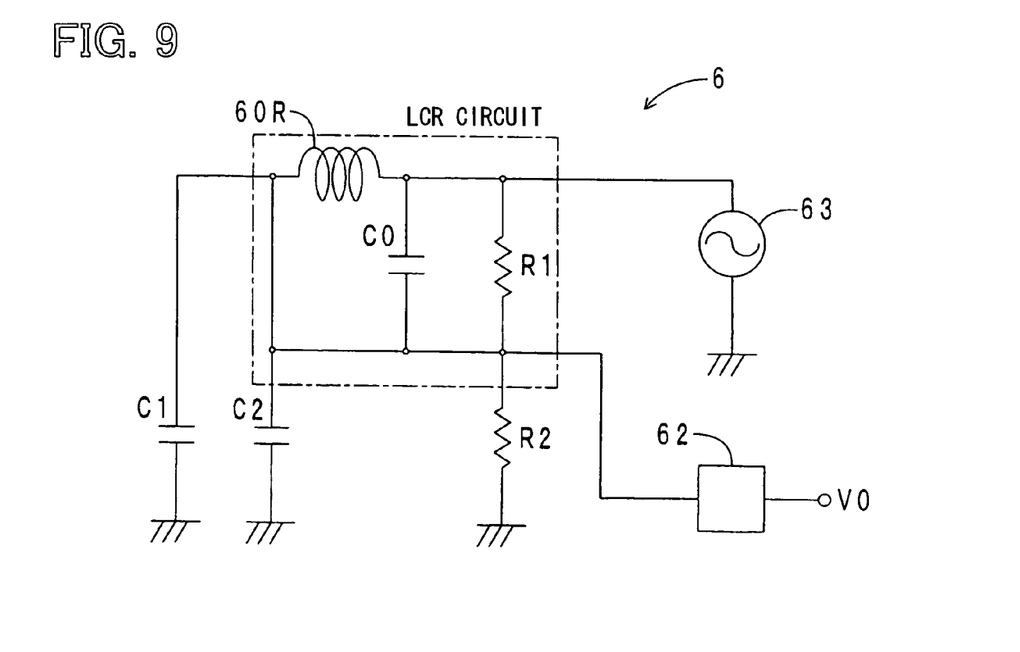
FIG. 9 is a circuit diagram of the impedance sensor according to the second embodiment.

According to a second embodiment of the present invention with reference to FIGS. 8 and 9, the first detection unit is provided with an impedance sensor 6 for detecting one of an AC impedance which varies due to an relative approach of the obstacle and an electricity amount related to the AC impedance. That is the difference of the second embodiment from the above-described first embodiment, in which the optical fiber sensor 2 is used as the first detection unit.

Referring to FIG. 8, the impedance sensor 6 includes coils 60R, 60M and 60L, which are attached to the rear surface of the bumper cover 90. The coils 60R, 60M and 60L are provided with the same circuit composition with each other. The circuit composition of the coil 60R will be described as an example.

As shown in FIG. 9, the coil 60R of the impedance sensor 6 is connected with a smoothing circuit 62, resistances R1 and R2, capacitors C0, C1 and C2 and the like. The coil 60R, the capacitor C0 and the resistance R1 are connected with each other in parallel, to construct a LCR circuit. The resistance R2 is connected with one terminal of the LCR circuit in series. The other terminal of the LCR circuit is connected with an AC power source 63. The capacitor C1, C2 has a stray capacity between the ground and the terminal of the coil 60R, and constructs the distribution capacity of the coil 60R. The voltage descent of the resistance R2 is rectified and smoothed by the smoothing circuit 62, and then sent to the obstacle discrimination ECU.

Next, the operation of the impedance sensor 6 in a collision will be described.

At first, the case where the vehicle collides with a metal obstacle will be described. For example, when the metal obstacle relatively approaches the coil 60R, the impedance of the coil 60R will be decreased due to the influence of eddy current induced by the metal obstacle. In this case, the generation of the eddy current is equivalent to a decrease of the resistance R1, which is connected with the coil 60R (having impedance) in parallel. Therefore, when the metal obstacle relatively approaches the coil 60R, the impedance of the LCR circuit is decreased. Thus, voltage VO output to the obstacle discrimination ECU 4 is increased.

Then, the case where the vehicle collides with an insulation obstacle (including pedestrian) will be described. The insulation obstacle is DC or AC grounded. Therefore, when the insulation obstacle relatively approaches the coil 60R, the stray capacity between the ground and the coil 60R (i.e., capacity of capacitor C1, C2) will be increased. Thus, a composite impedance of the resistance R2 and the capacitor C2 is decreased. Then, the voltage VO output to the obstacle discrimination ECU 4 is decreased.

The case where the obstacle relatively approaches the coil 60M, 60L is the same with that of the coil 60R, and not described here. Thus, the impedance sensor 6 can detect the collision through variation of the output voltage VO.

The obstacle discrimination device 1 according to the second embodiment has the same effects with the first embodiment. Moreover, according to the second embodiment, the collision can be detected before the obstacle contacts the front surface of the bumper cover 90. Therefore, if the obstacle is the pedestrian, the pedestrian protection airbags 70L and 70R can be speedily deployed.

Other Embodiments

Although the present invention has been fully described in connection with the preferred embodiments thereof with reference to the accompanying drawings, it is to be noted that various changes and modifications will become apparent to those skilled in the art.

For example, a movable bonnet can be also provided for the pedestrian protection device of the vehicle, and activated based on the detection signals of the first detection unit and the second detection unit. The movable bonnet can be immediately lifted up when it is determined that the obstacle is the pedestrian. Thus, the pedestrian is placed (falls) onto the bonnet, so that the impact due to a secondary collision applied to the pedestrian can be buffered.

In the above-described embodiments, the acceleration sensor 3R, 3L is used as the satellite sensor for the passenger protection device. However, the acceleration sensor 3R, 3L can be also used as a main sensor for the obstacle discrimination ECU 4.

In the above-described embodiments, the second detection unit (acceleration sensor 3R, 3L) is mounted at the front side member 80R, 80L. However, the second detection unit can be also attached to other body members, body reinforce members and the like of the vehicle. Specifically, the second detection unit can be also attached to, for example, the bumper reinforce member 83, a floor side member, an engine mounting center member, a front floor under reinforcement. Moreover, the second detection unit 3R, 3L can be mounted at an airbag ECU casing which has a high damage-resistant strength.

Moreover, a semiconductor laser can be also used instead of the light emitting diode D1, as the light emitting unit. A photo transistor can be also used instead of the photo diode D2, as the light receiving unit.

Furthermore, the coils 60R, 60M and 60L of the impedance sensor 6 can be also arranged at the front surface of the bumper cover 90.

In the discrimination process of the obstacle discrimination ECU 4, the light-collision discrimination step for distinguishing the lightweight obstacle and the heavy-collision discrimination step for distinguishing the heavyweight obstacle can be also performed without considering the time order between the two steps.

The obstacle discrimination ECU 4 can also perform the discrimination for determining whether or not the obstacle is the lightweight obstacle and the discrimination for determining whether or not the obstacle is the heavyweight obstacle based on the detection signals of the first detection unit, and performs the backup discrimination for determining whether or not the obstacle is the heavyweight obstacle based on the detection signals of the second detection unit.

A bearing sensor (having a resistance varying with the load exerted thereto), a strain gauge, a pressure sensor or the like which is capable of detecting a load can be also used instead of the optical fiber sensor 2, as the load sensor of the first detection unit.

Such changes and modifications are to be understood as being in the scope of the present invention as defined by the appended claims.

What is claimed is:

1. An obstacle discrimination device for discriminating among a pedestrian, a lightweight obstacle lighter than the pedestrian and a heavyweight obstacle heavier than the pedestrian in a collision of a vehicle, the obstacle discrimination device comprising:
   a first detection unit;
   a second detection unit which is more resistant to an impact due to the collision than the first detection unit, wherein
   the first detection unit is mounted at a low-stiffness member of the vehicle, the low-stiffness member being readily deformed to buffer the impact in the collision,
   the second detection unit is mounted at a high-stiffness member of the vehicle, the high-stiffness member being more resistant to a deformation than the low-stiffness member, and
   the high-stiffness member includes two front side members of the vehicle; and
   an obstacle discrimination ECU performing at least one of a discrimination for determining whether or not an obstacle colliding with the vehicle is the lightweight obstacle and a discrimination for determining whether or not the obstacle is the heavyweight obstacle based on detection signals of the first detection unit, and
   performing the discrimination for determining whether or not the obstacle is the heavyweight obstacle based on detection signals of the second detection unit, the obstacle discrimination ECU sending instructions corresponding to discrimination results to a pedestrian protection device of the vehicle, wherein
   the obstacle discrimination ECU determines that the obstacle colliding with the vehicle is the heavyweight obstacle when an output value of the second detection unit is larger than a first threshold value, and does not activate a passenger protection airbag when the output value of the second detection unit is larger than the first threshold value but is smaller than a second threshold value that is larger than the first threshold value, and
   the obstacle discrimination ECU activates the passenger protection airbag to be deployed when the output value of the second detection unit is larger than the second threshold value.

2. The obstacle discrimination device according to claim 1, wherein:
   the obstacle discrimination ECU performs the discrimination for determining whether or not the obstacle is the lightweight obstacle and the discrimination for determining whether or not the obstacle is the heavyweight obstacle, based on the detection signals of the first detection unit; and
   the obstacle discrimination ECU performs a backup discrimination for determining whether or not the obstacle is the heavyweight obstacle based on the detection signals of the second detection unit.

3. The obstacle discrimination device according to claim 1, wherein
   the obstacle discrimination ECU performs the discrimination for determining whether or not the obstacle is the lightweight obstacle based on the detection signals of the first detection unit, and the discrimination for determining whether or not the obstacle is the heavyweight obstacle based on the detection signals of the second detection unit.

4. The obstacle discrimination device according to claim 1, wherein the low-stiffness member is a front bumper of the vehicle.

5. The obstacle discrimination device according to claim 1, wherein the second detection unit is arranged at a vehicle rear side of the first detection unit.

6. The obstacle discrimination device according to claim 1, wherein the first detection unit is a load sensor for detecting a load exerted at the vehicle in the collision.

7. The obstacle discrimination device according to claim 6, wherein:
   the load sensor is an optical fiber sensor which has a light emitting unit for emitting light, an optical fiber member for transmitting light emitted by the light emitting unit, and a light receiving unit for receiving light transmitted through the optical fiber member; and
   the optical fiber sensor detects the load according to a light receiving amount of the light receiving unit, which varies corresponding to a deformation of the optical fiber member in the collision.

8. The obstacle discrimination device according to claim 1, wherein
the first detection unit is an impedance sensor for detecting one of an AC impedance which varies due to a relative approach of the obstacle, and an electricity amount related to the AC impedance.

9. The obstacle discrimination device according to claim 1, wherein the second detection unit includes at least one acceleration sensor for detecting an acceleration of the vehicle in the collision.

10. The obstacle discrimination device according to claim 1, wherein the detection signals of the second detection unit are used for actuation of both the pedestrian protection device and a passenger protection device of the vehicle.

11. The obstacle discrimination device according to claim 10, wherein:
the pedestrian protection device includes at least one pedestrian protection airbag; and
the passenger protection device includes at least one passenger protection airbag.

12. The obstacle discrimination device according to claim 1, wherein
the obstacle discrimination ECU activates at least one pedestrian protection airbag and at least one passenger protection airbag based on the detection signals of the first detection unit and the second detection unit.

13. The obstacle discrimination device according to claim 12, wherein:
the obstacle discrimination ECU activates the pedestrian protection airbag, when an output value from the first detection unit is larger than or equal to a first-detection unit threshold value and output value from the second detection unit is smaller than the first threshold value.

14. The obstacle discrimination device according to claim 13, further comprising
a velocity sensor for detecting a velocity of the vehicle, wherein the first-detection unit threshold value and the first and second threshold values are corrected responding to the velocity of the vehicle.

15. The obstacle discrimination device according to claim 7, wherein the optical fiber member has a substantial cord shape, and is arranged to traverse a whole front bumper of the vehicle in a vehicle width direction.

16. An obstacle discrimination method for discriminating among a pedestrian, a lightweight obstacle lighter than the pedestrian and a heavyweight obstacle heavier than the pedestrian in a collision of a vehicle, the obstacle discrimination method comprising:
a light-collision discrimination step for determining whether or not an obstacle colliding with the vehicle is the lightweight obstacle based on detection signals of a first detection unit; and
a heavy-collision discrimination step for determining whether or not the obstacle is the heavyweight obstacle based on the detection signals of the first detection unit and detection signals of a second detection unit, wherein
the first detection unit is mounted at a tow-stiffness member of the vehicle, the low-stiffness member being readily deformed to buffer an impact in the collision,
the second detection unit is mounted at a high-stiffness member of the vehicle, the high-stiffness member being more resistant to a deformation than the low-stiffness member, and
the high-stiffness member is a front side member of the vehicle, and further wherein the heavy-collision discrimination step includes determining that the obstacle is a heavyweight obstacle when the detection signal of the second detection unit is larger than a first threshold, and
not activating a passenger protection airbag when the detection signal of the second detection unit is larger than the first threshold but is smaller than a second threshold that is larger than the first threshold, and
activating the passenger protection airbag to be deployed when the detection signal of the second detection unit is larger than the second threshold.

17. The obstacle discrimination method according to claim 16, wherein:
in the light-collision discrimination step, it is determined that the obstacle is the lightweight obstacle when data from the detection signals of the first detection unit are smaller than a first-detection unit threshold value.

18. An obstacle discrimination device for discriminating among a pedestrian, a lightweight obstacle lighter than the pedestrian, and a heavyweight obstacle heavier than the pedestrian in a collision of a vehicle, the obstacle discrimination device comprising:
a first detection unit;
a second detection unit which is more resistant to an impact due to the collision than the first detection unit; and
an obstacle discrimination ECU performing
a first discrimination for determining whether an or not an obstacle colliding with the vehicle is the lightweight obstacle based on a detection signal of the first detection unit,
a second discrimination for determining whether the obstacle is the pedestrian based on a detection signal from the first detection unit and a detection signal from the second detection unit, and
a third discrimination for determining whether the obstacle is the heavyweight obstacle based on a detection signal from the second detection unit, wherein
the first discrimination results in a determination that an obstacle colliding with the vehicle is a lightweight obstacle when the detection signal of the first detection unit is less than a first detection unit threshold value, and
the second discrimination results in a determination that the obstacle colliding with the vehicle is a pedestrian when the detection signal of the first detection unit is greater than or equal to the first detection unit threshold value and the detection signal of the section detection unit is less than a first threshold value of the second detection unit, and
the third discrimination results in a determination that an obstacle colliding with the vehicle is a heavyweight obstacle when the detection signal of the second detection unit is greater than the first threshold value of the second detection unit.

19. The obstacle discrimination device according to claim 18, wherein
when the second discrimination results in a determination that the obstacle colliding with the vehicle is a pedestrian, the obstacle discrimination ECU activates at least one pedestrian protection device, and
when the second discrimination results in a determination that the obstacle colliding with the vehicle is the heavyweight obstacle, the obstacle discrimination ECU activates at least one passenger protection device if the value of the second detection unit is larger than a second threshold value of the second detection unit that is larger than the first threshold value of the second detection unit.

20. The obstacle discrimination device according to claim 1, wherein
the low-stiffness member is a front bumper of the vehicle,
the two front side members are disposed at a vehicle right side and a vehicle left side, and
the second detection unit includes two sensors that are respectively mounted at the upper surfaces of the two front side members and the first detection unit includes a sensor that is mounted at a portion of the front bumper that is disposed at the vehicle front side of the front side members.

21. The obstacle discrimination device according to claim 20, wherein
the impact of a collision is substantially transmitted to the two sensors through the front side members.

22. The obstacle discrimination device according to claim 1, wherein
in the case where the obstacle colliding with the vehicle is a heavyweight obstacle, performing the discrimination for determining whether or not the obstacle colliding with the vehicle is a heavyweight obstacle is performed even if the first detection unit is broken in the collision of the vehicle.

23. The obstacle discrimination device according to claim 18, wherein
in the case where the obstacle colliding with the vehicle is a heavyweight obstacle, performing the third discrimination occurs even if the first detection unit is broken in the collision of the vehicle.

* * * * *